(12) United States Patent
Ishizawa

(10) Patent No.: US 7,616,140 B2
(45) Date of Patent: Nov. 10, 2009

(54) A/D CONVERTER PREVENTING RESULTS OF A/D CONVERSION FROM BEING OVERWRITTEN

(75) Inventor: Masahito Ishizawa, Kawasaki (JP)

(73) Assignees: Fujitsu Microelectronics Limited, Tokyo (JP); Fujitsu Electronics Inc., Tokyo (JP)

( * ) Notice: Subject to any disclaimer, the term of this patent is extended or adjusted under 35 U.S.C. 154(b) by 0 days.

(21) Appl. No.: 12/155,314

(22) Filed: Jun. 2, 2008

(65) Prior Publication Data

US 2008/0303702 A1 Dec. 11, 2008

(30) Foreign Application Priority Data

Jun. 8, 2007 (JP) ............................. 2007-152269

(51) Int. Cl.
*H03M 1/00* (2006.01)
(52) U.S. Cl. ...................................... 341/141; 341/155
(58) Field of Classification Search .......... 341/141–155
See application file for complete search history.

(56) References Cited

U.S. PATENT DOCUMENTS 5,812,928 A * 9/1998 Watson et al. ............... 725/118

OTHER PUBLICATIONS

Patent Abstracts of Japan: Japanese Patent Publication No. 09-269870, Publication Date: Oct. 14, 1997, Inventor: Oya Mitsunari. (1 page only).

* cited by examiner

*Primary Examiner*—Lam T Mai
(74) *Attorney, Agent, or Firm*—Staas & Halsey LLP

(57) ABSTRACT

An A/D converter capable of generating an interrupt for requesting a control circuit to read the results of A/D conversion, in desired timing. Analog signals input from channels selected by a channel-selecting section are input to an A/D conversion section, and are sequentially A/D-converted. The results of A/D conversion are sequentially stored in different stages of a FIFO. A stage number-counting section counts the number of the stages of the FIFO where the results of A/D conversion are stored. An interrupt signal-delivering section outputs an interrupt signal for requesting a CPU to read the results of A/D conversion when the number of stages counted by the stage number-counting section is equal to an interrupt-generating stage number set by an interrupt-generating stage number-setting section.

7 Claims, 3 Drawing Sheets

A/D CONVERTER PREVENTING RESULTS OF A/D CONVERSION FROM BEING OVERWRITTEN

CROSS-REFERENCE TO RELATED APPLICATION

This application is based upon and claims the benefits of priority from the prior Japanese Patent Application No. 2007-152269, filed on Jun. 8, 2007, the entire contents of which are incorporated herein by reference.

BACKGROUND

1. Field

This embodiment relates to an A/D (Analog/Digital) converter, which may convert analog signals input from a plurality of channels.

2. Description of the Related Art

An A/D converter is known which selects desired channels from a plurality of channels of analog inputs, and performs A/D conversion.

In the case where the A/D converter of this kind is provided with a single register for storing results of A/D conversion, it is required, whenever an analog signal input from a channel is A/D-converted, to generate an interrupt for requesting an external control circuit (CPU (Central Processing Unit) or the like) to read the result of A/D conversion. This results in frequent generation of the interrupt and lowered throughput of the external control circuit. Further, when the A/D converter is provided with registers for all the channels, respectively, the circuit scale of the A/D converter increases, and since all the channels are not necessarily used, some of the provided registers sometimes are not necessary.

In view of this, an A/D converter has been proposed which is provided with a smaller number of registers than the number of channels thereof, and has the channels thereof divided into several groups (hereinafter referred to as "the channel groups"), whereby a read-requesting interrupt is caused to be generated whenever A/D conversion of each channel group is completed. For example, Japanese Laid-Open Patent Publication (Kokai) No. H09-269870 discloses an A/D converter in which input channels are switched not by an external CPU but by an internal sequencer, thereby making it possible to shorten a time period taken to switch the channel groups.

In the conventional A/D converter, however, the interrupt is generated when the conversion of each channel group is completed, and hence when transfer of the result of A/D conversion to the outside is not performed in time, the register can be overwritten with the result of A/D conversion of the next channel group.

Further, when e.g. a change in information on a specific channel is desired to be inspected, A/D conversion of the same channel is repeated. In this case, in the conventional A/D converter, the registers for storing the results of A/D conversion are fixed on a channel-by-channel basis. Therefore, when the A/D conversion of the same channel is repeated, the results of the preceding A/D conversion are overwritten by the results of the following A/D conversion. Therefore, it is required to generate an interrupt to a control circuit, such as a CPU, to cause the same to read information in the register whenever A/D conversion is completed. This increases load on the control circuit, and results in an increased processing time period.

SUMMARY

It is an aspect of the embodiments discussed herein to provide an A/D converter for A/D-converting analog signals input from a plurality of channels, including: a channel-selecting section selecting channels from the plurality of channels, for A/D conversion of the analog signals; an A/D conversion section sequentially A/D-converting the analog signals from the selected channels on a channel-by-channel basis; a FIFO (first-In, First-Out) including a plurality of stages of storage areas, and sequentially storing results of A/D conversion on a channel-by-channel basis in different ones of the plurality of stages; a stage number-counting section counting a number of stages of the FIFO where the results of A/D conversion are stored; an interrupt-generating stage number-setting section setting a interrupt-generating stage number; and an interrupt signal-delivering section delivering an interrupt signal for requesting a control circuit reading the results of A/D conversion to read the results of A/D conversion, when the number of stages counted by the stage number-counting section becomes equal to the interrupt-generating stage number.

The above and other objects, features and advantages of the present invention will become apparent from the following description when taken in conjunction with the accompanying drawings which illustrate preferred embodiments of the present invention by way of example.

DESCRIPTION OF THE EMBODIMENTS

The invention will now be described in detail with reference to the drawings showing embodiments thereof.

Figure 1:
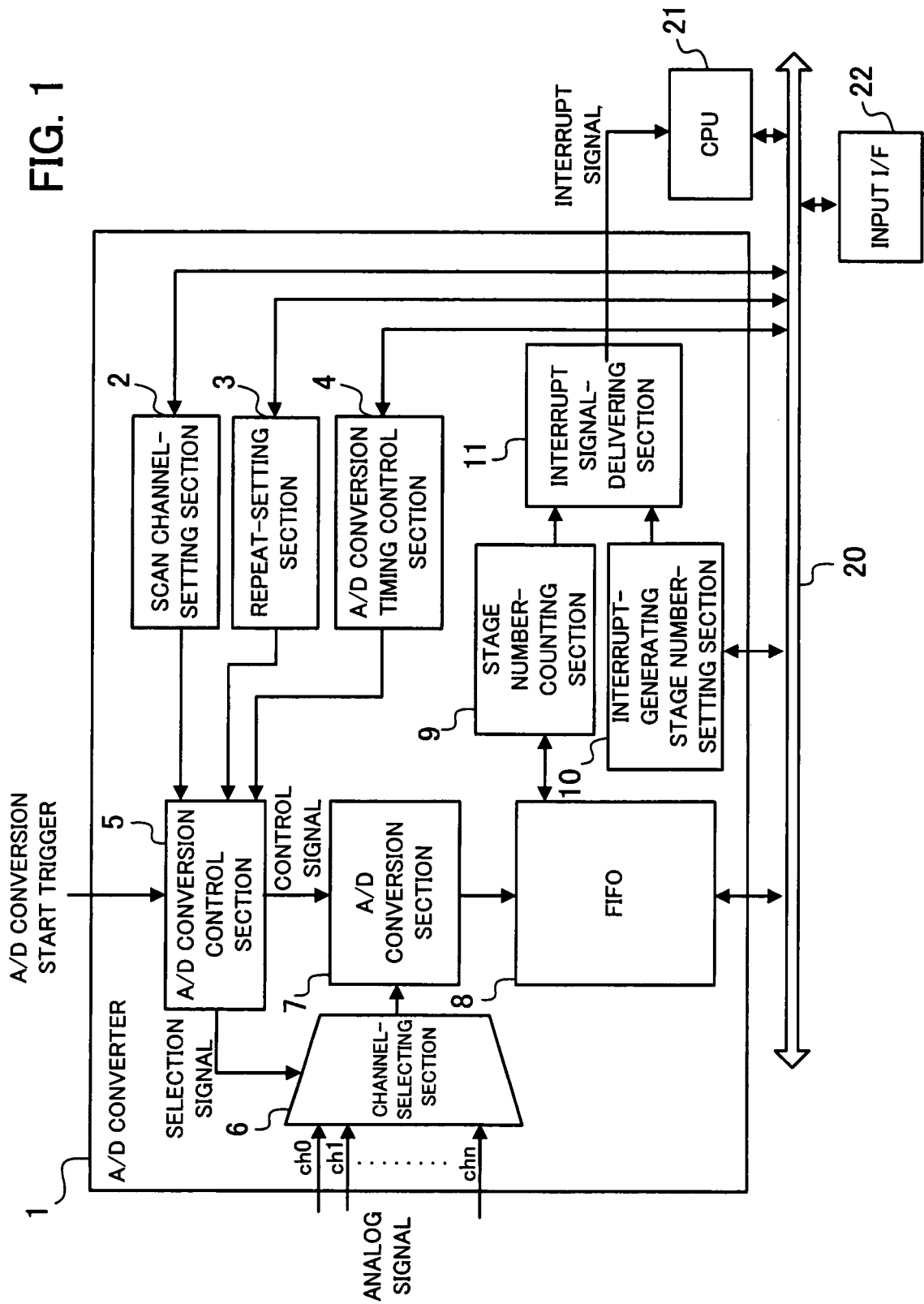
FIG. 1 is a view of an A/D converter according to an embodiment.

FIG. 1 is a view of the arrangement of an A/D converter according to an embodiment.

The A/D converter 1 includes a scan channel-setting section 2, a repeat-setting section 3, an A/D conversion timing control section 4, an A/D conversion control section 5, a channel-selecting section 6, an A/D conversion section 7, a FIFO 8, a stage number-counting section 9, an interrupt-generating stage number-setting section 10, and an interrupt signal-delivering section 11.

The scan channel-setting section 2 is a register for setting a channel group including a plurality of channels (scan channels) for which A/D conversion of analog signals is to be sequentially performed, and is formed by bits associated with the channels. For example, when the number of channels is 32, it is assumed that bits associated with respective channels ch0 to ch31 are represented by AN0 to AN31. Now, when A/D conversion is performed sequentially for the channels ch1, ch3, ch5, and ch23 (when a channel group of these channels is set), the bits of AN1, AN3, AN5, and AN23 are each set e.g. to 1. The channel group can be changed in desired timing.

The repeat-setting section 3 is a register for setting whether or not the A/D conversion for the channels set by the scan channel-setting section 2 is to be repeated. For example, when the A/D conversion is to be repeated, the repeat-setting section 3 has 1 set therein, whereas when the A/D conversion is not to be repeated, the repeat-setting section 3 has 0 set therein. The setting may be changed in desired timing even after the start of the A/D conversion.

The A/D conversion timing control section 4 is a register for having a bit or the like set therein for controlling the A/D conversion. For example, when 1 is written into this register during stoppage of the A/D conversion, the A/D conversion is started. It should be noted that to start the A/D conversion, an A/D conversion start trigger input to the A/D conversion control section 5 (e.g. signal of a timer) may be used.

The above-described registers are connected to an external bus 20, and have values set thereto by a user's inputs via an input I/F (interface) 22 under the control of a CPU 21 connected to the bus 20.

It should be noted that although in the present embodiment, the scan channel-setting section 2, the repeat-setting section 3, and the A/D conversion timing control section 4 are illustrated as three separate sections, they may be formed e.g. by one register.

The A/D conversion control section 5 includes a decoder, not shown, to generate selection signals for use in selecting channels by the channel-selecting section 6 and control signals for controlling the operation of the A/D conversion section 7, based on information set by the scan channel-setting section 2, the repeat-setting section 3, and the A/D conversion timing control section 4.

The channel-selecting section 6 has a plurality of analog signals input thereto from a plurality of channels ch0, ch1, . . . , and chn, and selects channels for which A/D conversion of the input analog signals is to be performed, according to the selection signals delivered from the A/D conversion control section 5.

The A/D conversion section 7 sequentially A/D-converts the analog signals from the channels selected by the channel-selecting section 6, on a channel-by-channel basis.

The FIFO 8 includes a register having a plurality of stages of storage areas, for sequentially storing results of A/D conversion in respective different stages. For example, the FIFO 8 has storage areas the number of stages of which is smaller than the number of the channels. It should be noted that each stage also stores channel information indicative of a channel, whereby it is possible to identify the channel for which the stage stores the result of A/D conversion of the associated analog signal. Further, the FIFO 8 is connected to the bus 20 so as to allow the results of A/D conversion to be read under the control of the CPU 21.

The stage number-counting section 9 counts the number of stages of the FIFO 8, where the results of A/D conversion are stored.

The interrupt-generating stage number-setting section 10 is, e.g., a register in which is set a stage number (interrupt-generating stage number) of a stage for which an interrupt is to be generated. For example, when an interrupt is desired to be generated for a first stage of the FIFO 8, the interrupt-generating stage number-setting section 10 sets "0000" to the bits, and when an interrupt is desired to be generated for a third stage of the FIFO 8, it sets "0010", while when an interrupt is desired to be generated for a sixteenth stage of the FIFO 8, it sets "1111". The interrupt-generating stage number-setting section 10 is connected to the bus 20 so as to permit a value to be changed in desired timing in response to a user's input from the input I/F 22.

The interrupt signal-delivering section 11 delivers an interrupt signal for requesting reading of the results of A/D conversion to the CPU 21 when the value of the count by the stage number-counting section 9 becomes equal to the interrupt-generating stage number set by the interrupt-generating stage number-setting section 10.

It should be noted that although in FIG. 1, the scan channel-setting section 2, the repeat-setting section 3, the A/D conversion timing control section 4, the FIFO 8, and the interrupt-generating stage number-setting section 10 are configured to be connected to the external bus 20, they may be configured to be connected to the external bus 20 via an internal bus, not shown.

Further, the above-described A/D converter 1 can be realized by a one-chip circuit.

Next, a description will be given of the operation of the A/D converter 1 according to the present embodiment.

When the A/D conversion timing control section 4 has 1 written in the bit for starting the A/D conversion or has the A/D conversion start trigger input thereto, the channel group set by the scan channel-setting section 2 is loaded in the A/D conversion control section 5. This causes the A/D conversion control section 5 to generate selection signals for causing the channels of the channel group to be sequentially selected, and delivers the selection signals to the channel-selecting section 6. The channel-selecting section 6 sequentially selects channels in response to the selection signals, and supplies analog signals input from the selected channel to the A/D conversion section 7. The A/D conversion section 7 carries out A/D conversion based on the control signal from the A/D conversion control section 5.

The results of A/D conversion are sequentially stored in different stages of the FIFO 8 on a channel-by-channel basis. At this time, the stage number-counting section 9 counts the number of stages of the FIFO 8 where the results of A/D conversion are stored. When the stage number counted by the stage number-counting section 9 becomes equal to the interrupt-generating stage number stored in the interrupt-generating stage number-setting section 10, the interrupt signal-delivering section 11 delivers an interrupt signal to the CPU 21.

It should be noted that when repeat of the A/D conversion is set by the repeat-setting section 3, the A/D conversion of the channels set by the scan channel-setting section 2 is repeated.

Figure 2:
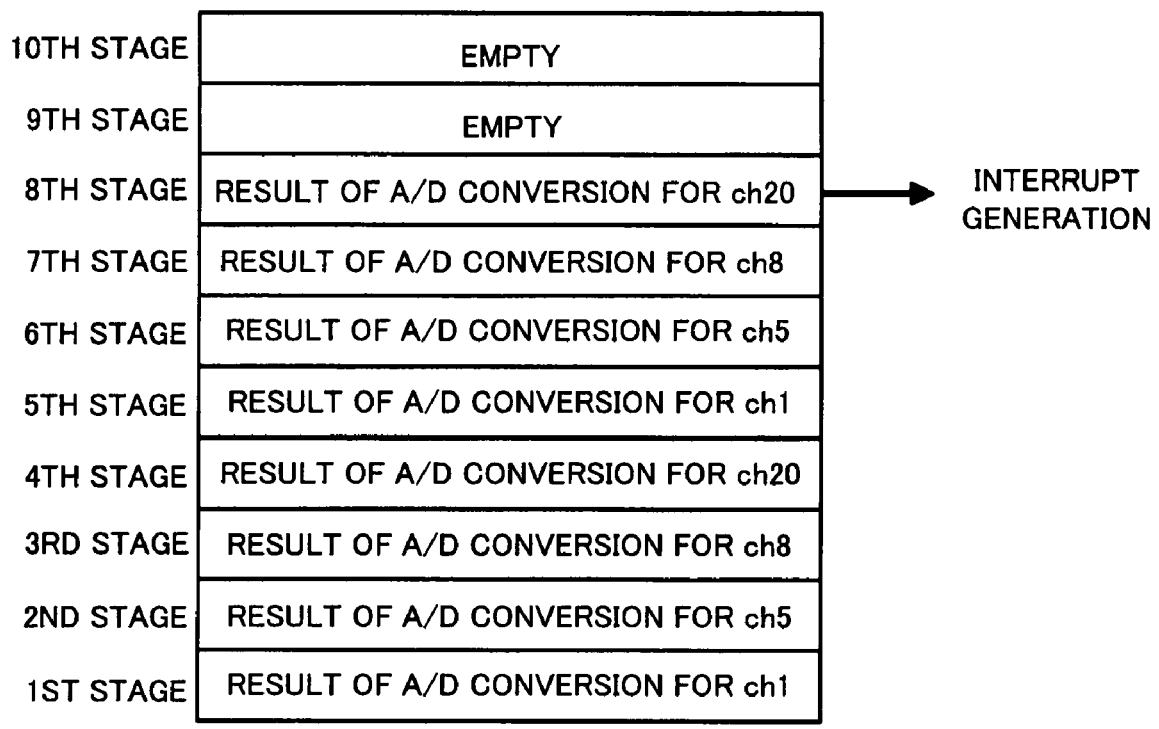
FIG. 2 is a view showing an example of the results of A/D conversion stored in a FIFO when the A/D conversion is repeated.

FIG. 2 is a view showing an example of the results of A/D conversion stored in the FIFO when the A/D conversion is repeated.

The illustrated example shows the FIFO 8 having 10 stages. When the channels ch1, ch5, ch8, and ch20 are sequentially selected in the mentioned order by the channel-selecting section 6, the results of A/D conversion of analog signals from the channels ch1, ch5, ch8, and ch20 are sequentially stored in the first to fourth stages of the FIFO 8 in an increasing order of the stage number. When repeat of the A/D conversion is set by the repeat-setting section 3, the results of A/D conversion of the analog signals from the channels ch1, ch5, ch8, and ch20 are stored again from the fifth stage. Further, if the interrupt-generating stage number-setting section 10 has "1000" set therein, an interrupt is generated when the storage of the result of AD conversion in the eighth stage of the FIFO 8 is performed, and the stored data are sequentially read out by the CPU 21 from the first stage in the increasing order of the stage number.

As described above, in the A/D converter 1 according to the present embodiment, interrupt generation timing for requesting reading of the results of A/D conversion is determined based on the interrupt-generating stage number stored in the interrupt-generating stage number-setting section 10, so that by changing the setting of the interrupt-generating stage number, the interrupt generation timing can be easily changed according to the system. This makes it possible to prevent the results of A/D conversion from being overwritten against the intention of the user.

Further, the interrupt generation timing is determined based on the interrupt-generating stage number, whereby when transition of data of the same channel is desired to be inspected, or an average thereof is desired to be obtained, it is also possible to store a plurality of results of A/D conversion of the same channel in different ones of the stages of the FIFO 8, as shown in FIG. 2, to read these results of A/D conversion by a single interrupt handling routine. In short, the frequency of generation of the interrupt can be reduced, and hence it is possible to decrease load on the CPU 21 to enhance the processing speed thereof.

Hereinafter, an example of the operation of the A/D converter 1 according to the present embodiment will be described with reference to a timing diagram.

Figure 3:
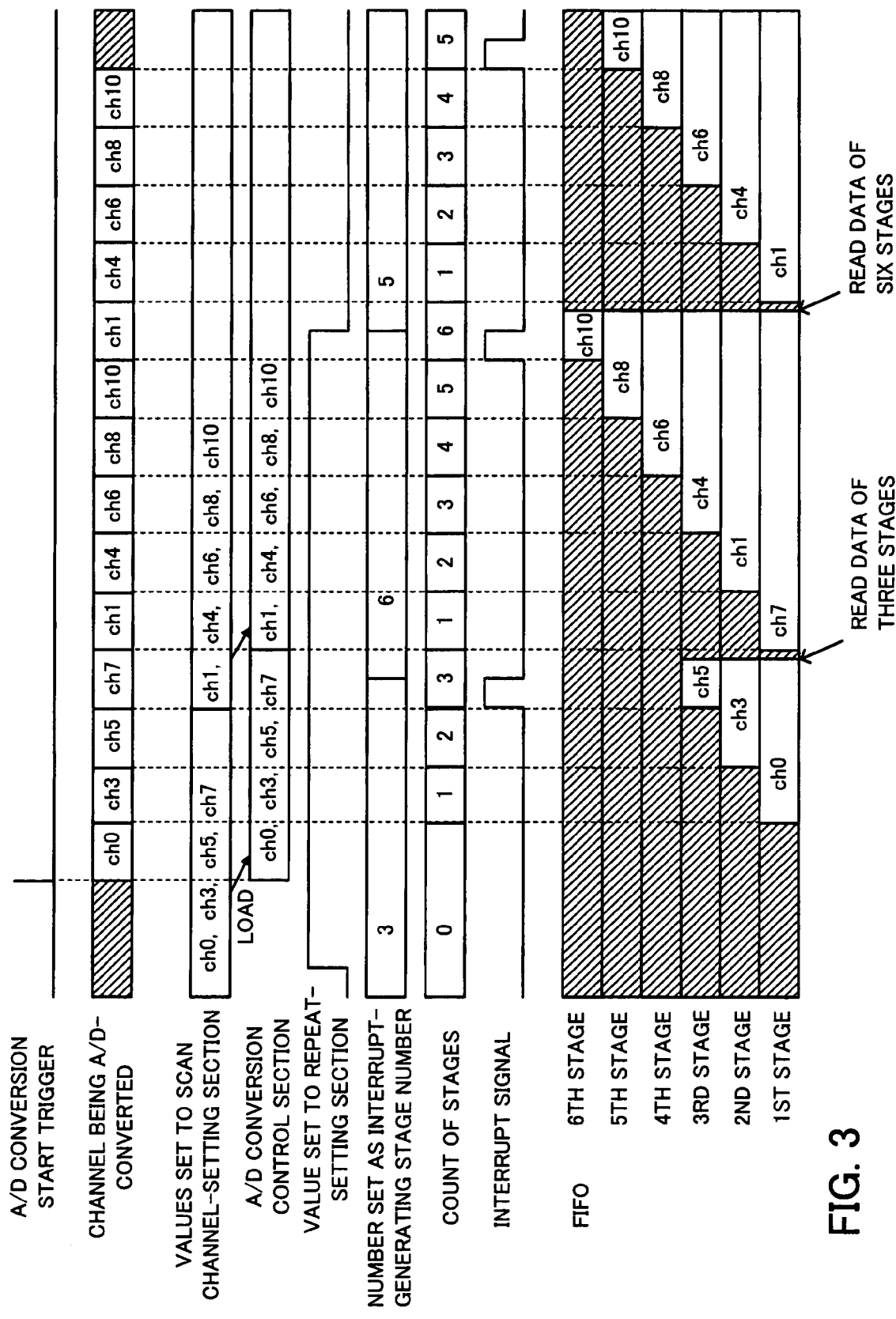
FIG. 3 is a timing diagram showing an example of the operation of the A/D converter according to the present embodiment.

FIG. 3 is a timing diagram showing the example of the operation of the A/D converter according to the present embodiment.

The FIG. 3 timing diagram shows, from the top of the figure, an A/D conversion start trigger, a channel for which the A/D conversion section 7 is performing A/D-conversion, values set in the scan channel-setting section 2, a channel group loaded in the A/D conversion control section 5, a value set in the repeat-setting section 3, an interrupt-generating stage number set by the interrupt-generating stage number-setting section 10, the number of stages counted by the stage number-counting section 9, an interrupt signal, and contents of the FIFO 8.

FIG. 3 shows a case in which the channels ch0, ch3, ch5, and ch7 are first set as a channel group by the scan channel-setting section 2. More specifically, bits AN0, AN3, AN5, and AN7 associated with the respective channels ch0, ch3, ch5, and ch7 are set to 1.

When the A/D conversion start trigger is input, the values set by the scan channel-setting section 2 are loaded in the A/D conversion control section 5. First, the A/D conversion control section 5 delivers a selection signal for selection of the channel ch0 to the channel-selecting section 6. The channel-selecting section 6 supplies an analog signal from the channel ch0 to the A/D conversion section 7. The A/D conversion section 7 A/D-converts the analog signal from the channel ch0, and stores the result of A/D conversion in the first stage of the FIFO 8. At this time, the interrupt-generating stage number counted by the stage number-counting section 9 is equal to 1. Similarly, the A/D conversion control section 5 sequentially delivers selection signals for selection of the channels ch3, ch5, and ch7 to the channel-selecting section 6. The channel-selecting section 6 sequentially selects the channels ch3, ch5, and ch7. The A/D conversion section 7 A/D-converts analog signals from the channels ch3, ch5, and ch7, and sequentially stores the results of A/D conversion in the second stage et seq. of the FIFO 8 in the increasing order of the stage number.

However, as shown in FIG. 3, the interrupt-generating stage number set by the interrupt-generating stage number-setting section 10 is 3. Therefore, the interrupt signal-delivering section 11 delivers an interrupt signal to the external CPU 21 when the interrupt-generating stage number counted by the stage number-counting section 9 becomes equal to 3. In the example illustrated in FIG. 3, when the result of A/D conversion of the analog signal from the channel ch5 is stored in the FIFO 8, the interrupt signal is delivered to the CPU 21. In response to the interrupt signal, the CPU 21 sequentially reads the results of A/D conversion stored in the three stages of the FIFO 8 via the bus 20, from the first to third stages in the mentioned order. It should be noted that also when the interrupt signal is delivered, the analog signal from the channel ch7 is being A/D-converted. After reading from the third stage is terminated and the FIFO 8 becomes empty, upon termination of the A/D conversion of the analog signal from the channel ch7, the result of A/D conversion of the channel ch7 is stored in the first stage of the FIFO 8. It should be noted that if the A/D conversion of the analog signal from the channel ch7 is terminated before completion of reading of the channel ch5, the result of A/D conversion of the channel ch7 is stored in the fourth stage, and is continuously read after termination of the reading of the channel ch5.

In the example illustrated in FIG. 3, at the time point the A/D conversion of the analog signal of the channel ch7 is terminated, the value set to the repeat-setting section 3 is equal to 1, so that the A/D conversion is continued, and the values set to the scan channel-setting section 2 are changed in advance to those indicative of the channels ch1, ch4, ch6, ch8, and ch10. This change in the channel group is loaded to the A/D conversion control section 5 when the A/D conversion for the preceding group (ch0, ch3, ch5, and ch7) is terminated. Then, the analog signals of the channels ch1, ch4, ch6, ch8, and ch10 are sequentially A/D-converted and the results of A/D conversion are sequentially stored in the second stage et seq. of the FIFO 8 in the increasing order of the stage number. In the illustrated example, the set interrupt-generating stage number is changed to 6, so that when the interrupt signal-delivering section 11 recognizes, based on the interrupt-generating stage number counted by the stage number-counting section 9, that the result of A/D conversion of the analog signal of the channel ch10 is stored in a sixth stage of the FIFO 8, the interrupt signal-delivering section 11 delivers the interrupt signal to the external CPU 21. In response to the interrupt signal, the CPU 21 reads the results of A/D conversion stored in the six stages of the FIFO 8.

When the A/D conversion of the analog signal of the channel ch10 has been terminated, the value set to the repeat-setting section 3 is equal to 1, and at the same time the values set to the scan channel-setting section 2 remain the same. Therefore, the analog signals of the channels ch1, ch4, ch6, ch8, and ch10 are similarly A/D-converted again, and if the FIFO 8 is empty, the results of A/D conversion are sequentially stored in the FIFO 8 from the first stage. Since the value set to the interrupt-generating stage number is changed to 5, when the interrupt signal-delivering section 11 recognizes, based on the interrupt-generating stage number counted by the stage number-counting section 9, that the result of A/D conversion of the analog signal of the channel ch10 is stored in the fifth stage of the FIFO 8, the interrupt signal-delivering section 11 delivers the interrupt signal to the CPU 21. Upon reception of the interrupt signal, the CPU 21 reads the results of A/D conversion stored in the five stages of the FIFO 8. When the A/D conversion of the analog signal of the channel ch10 has been terminated, the value set to the repeat-setting section 3 is equal to 0, and hence the A/D conversion process is terminated.

As described above, according to the A/D converter 1 of the present embodiment, by changing the interrupt-generating stage number as desired, it is possible to read the results of preceding A/D conversion stored in the FIFO 8 in desired timing during execution of A/D conversion.

Further, it is possible to change a channel group for which A/D conversion should be performed next without stopping execution of A/D conversion. Further, the interrupt-generating stage number can also be changed without stopping A/D conversion, and it is possible to freely combine various conditions, such as the interrupt generation timing, channels for A/D conversion, whether or not A/D conversion should be repeated, and so forth.

Although the preferred embodiments have been described heretofore, an invention is by no means limited to any specific embodiment, but various modifications can be made thereto within the scope of the description in the appended claims.

For example, although as above-described, the CPU 21 is provided outside the A/D converter 1, a control circuit for reading the results of A/D conversion from the FIFO 8 may be formed inside the A/D converter 1.

According to the above, the output timing of the interrupt signal for requesting reading of the results of A/D conversion is determined depending on the interrupt-generating stage number set by the interrupt-generating stage number-setting section, so that by changing the interrupt-generating stage number, it is possible to easily change the interrupt generation timing according to the system. This makes it possible to prevent the results of A/D conversion from being overwritten against the intention of the user.

The foregoing is considered as illustrative only of the principles of an invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An A/D converter for A/D-converting analog signals input from a plurality of channels, comprising:
    a channel-selecting section selecting channels from said plurality of channels, for A/D conversion of the analog signals;
    an A/D conversion section sequentially A/D-converting the analog signals from the selected channels on a channel-by-channel basis;
    a FIFO including a plurality of stages of storage areas, and sequentially storing results of A/D conversion on a channel-by-channel basis in different ones of the plurality of stages;
    a stage number-counting section counting a number of stages of said FIFO where the results of A/D conversion are stored;
    an interrupt-generating stage number-setting section setting an interrupt-generating stage number; and
    an interrupt signal-delivering section delivering an interrupt signal for requesting a control circuit reading the results of A/D conversion to read the results of A/D conversion, when the number of stages counted by said stage number-counting section becomes equal to the interrupt-generating stage number.

2. An A/D converter as claimed in claim 1, further comprising:
    a channel-setting section setting a channel group comprising a plurality of channels for A/D-conversion of the analog signals, and
    a control section reading the channel group set by said channel-setting section, and supplying selection signals for causing said channel-selecting section to sequentially select the channels of the channel group.

3. An A/D converter as claimed in claim 2, further comprising:
    a repeat-setting section setting whether or not the A/D conversion is to be repeated,
    wherein said control section reads the channel group set by said channel-setting section if repeat of the A/D conversion has been set by said repeat-setting section when the A/D conversion of the channel group is terminated, and supplies the selection signals for causing said channel-selecting section to sequentially select the channels of the read channel group, to said channel-selecting section.

4. An A/D converter as claimed in claim 2, wherein said control section reads the channel group set by said channel-setting section when the A/D conversion of the channel group by said A/D conversion section is terminated.

5. An A/D converter as claimed in claim 1, wherein the interrupt-generating stage number is set in desired timing by said interrupt-generating stage number-setting section.

6. An A/D converter as claimed in claim 2, wherein the channel group is set in desired timing by said channel-setting section.

7. An A/D converter as claimed in claim 3, wherein whether or not the A/D conversion is to be repeated is set in desired timing by said repeat-setting section.

* * * * *